US012539071B1

(12) United States Patent
Chang et al.

(10) Patent No.: US 12,539,071 B1
(45) Date of Patent: Feb. 3, 2026

(54) EYE TRACKING TECHNIQUE FOR ASSESSMENT OF VISUAL ACUITY

(71) Applicant: Children's Hospital Los Angeles, Los Angeles, CA (US)

(72) Inventors: Melinda Y. Chang, Arcadia, CA (US); Mark S. Borchert, La Canada, CA (US)

(73) Assignee: Children's Hospital Los Angeles, Los Angeles, CA (US)

( * ) Notice: Subject to any disclaimer, the term of this patent is extended or adjusted under 35 U.S.C. 154(b) by 640 days.

(21) Appl. No.: 17/936,674

(22) Filed: Sep. 29, 2022

Related U.S. Application Data

(60) Provisional application No. 63/249,727, filed on Sep. 29, 2021.

(51) Int. Cl.
*A61B 5/00* (2006.01)
*A61B 3/032* (2006.01)
*A61B 3/113* (2006.01)

(52) U.S. Cl.
CPC ............ *A61B 5/4064* (2013.01); *A61B 3/032* (2013.01); *A61B 3/113* (2013.01); *A61B 2503/06* (2013.01); *A61B 2503/42* (2013.01)

(58) Field of Classification Search
CPC .............................. A61B 5/4064; A61B 3/032
See application file for complete search history.

(56) References Cited

U.S. PATENT DOCUMENTS

| 2011/0085140 | A1* | 4/2011 | Brown | A61B 3/028 351/239 |
| 2015/0190050 | A1* | 7/2015 | Samadani | A61B 5/7246 600/558 |
| 2022/0031157 | A1* | 2/2022 | Mayer | A61B 3/032 |
| 2022/0117484 | A1* | 4/2022 | Samadani | G16H 50/20 |
| 2022/0369923 | A1* | 11/2022 | De Villers-Sidani | G06T 7/277 |

OTHER PUBLICATIONS

Chang MY, Borchert MS. Advances in the evaluation and management of cortical/cerebral visual impairment in children. Surv Ophthalmol 2020;65:708-24.
Rahi JS, Cable N, British Childhood Visual Impairment Study G. Severe visual impairment and blindness in children in the UK. Lancet 2003;362:1359-65.
Pehere NK, Narasaiah A, Dutton GN. Cerebral visual impairment is a major cause of profound visual impairment in children aged less than 3 years: A study from tertiary eye care center in South India. Indian J Ophthalmol 2019;67:1544-7.
Kong L, Fry M, Al-Samarraie M, Gilbert C, Steinkuller PG. An update on progress and the changing epidemiology of causes of childhood blindness worldwide. J AAPOS 2012;16:501-7.

(Continued)

*Primary Examiner* — Daniel L Cerioni
(74) *Attorney, Agent, or Firm* — Stanek Lemon Crouse & Meeks, PA

(57) ABSTRACT

The present inventive concept provides methods of determining whether a subject has cortical or cerebral visual impairment (CVI) as well as determining whether the subject has a traumatic brain injury thereby allowing treatment for these conditions. The present inventive concept also provides a standardized method for assessing pediatric or adolescent visual acuity.

9 Claims, 4 Drawing Sheets

(56) References Cited

OTHER PUBLICATIONS

Good WV, Jan JE, DeSa L, Barkovich AJ, Groenveld M, Hoyt CS. Cortical visual impairment in children. Surv Ophthalmol 1994;38:351-64.

Jan JE, Groenveld M, Sykanda AM, Hoyt CS. Behavioural characteristics of children with permanent cortical visual impairment. Dev Med Child Neurol 1987;29:571-6.

Khetpal V, Donahue SP. Cortical visual impairment: etiology, associated findings, and prognosis in a tertiary care setting. J AAPOS 2007;11:235-9.

Huo R, Burden SK, Hoyt CS, Good WV. Chronic cortical visual impairment in children: aetiology, prognosis, and associated neurological deficits. Br J Ophthalmol 1999;83:670-5.

Handa S, Saffari SE, Borchert M. Factors Associated With Lack of Vision Improvement in Children With Cortical Visual Impairment. J Neuroophthalmol 2018;38:429-33.

Dutton G, Ballantyne J, Boyd G, et al. Cortical visual dysfunction in children: a clinical study. Eye (Lond) 1996; 10 ( Pt 3):302-9.

Saidkasimova S, Bennett DM, Butler S, Dutton GN. Cognitive visual impairment with good visual acuity in children with posterior periventricular white matter injury: a series of 7 cases. J AAPOS 2007;11:426-30.

Good WV, Hoyt CS. Behavioral correlates of poor vision in children. Int Ophthalmol Clin 1989;29:57-60.

Chang MY, Borchert MS. Methods of visual assessment in children with cortical visual impairment. Curr Opin Neurol 2021;34:89-96.

Good WV. Development of a quantitative method to measure vision in children with chronic cortical visual impairment. Trans Am Ophthalmol Soc 2001;99:253-69.

Bennett CR, Bailin ES, Gottlieb TK, Bauer CM, Bex PJ, Merabet LB. Assessing Visual Search Performance in Ocular Compared to Cerebral Visual Impairment Using a Virtual Reality Simulation of Human Dynamic Movement. Proceedings of Technology, Mind, and Society. Washington, DC: Association for Computing Machinery; 2018.

Bennett CR, Bailin ES, Gottlieb TK, Bauer CM, Bex PJ, Merabet LB. Virtual Reality Based Assessment of Static Object Visual Search in Ocular Compared to Cerebral Visual Impairment. In: Antona M, Stephanidis C, editors. Universal Access in Human-Computer Interaction Virtual, Augmented, and Intelligent Environments UAHCI 2018 Lecture Notes in Computer Science: Springer, Cham; 2018.

Kooiker MJG, Verbunt HJM, van der Steen J, Pel JJM. Combining visual sensory functions and visuospatial orienting functions in children with visual pathology: A longitudinal study. Brain Dev 2018.

Whiting S, Jan JE, Wong PK, Flodmark O, Farrell K, McCormick AQ. Permanent cortical visual impairment in children. Dev Med Child Neurol 1985;27:730-9.

Harris PA, Taylor R, Thielke R, Payne J, Gonzalez N, Conde JG. Research electronic data capture (REDCap)—a metadata-driven methodology and workflow process for providing translational research informatics support. J Biomed Inform 2009;42:377-81.

Sayed AM, Kashem R, Abdel-Mottaleb M, et al. Toward Improving the Mobility of Patients with Peripheral Visual Field Defects with Novel Digital Spectacles. Am J Ophthalmol 2020;210:136-45.

\* cited by examiner

EYE TRACKING TECHNIQUE FOR ASSESSMENT OF VISUAL ACUITY

CROSS-REFERENCE TO RELATED APPLICATION

The present application claims the benefit of U.S. Provisional Patent Application No. 63/249,727, filed Sep. 29, 2021, the disclosure of which is incorporated herein by reference in its entirety.

FIELD

The inventive concept relates to methods of detecting and/or treating cortical or cerebral visual impairment, and in more particular aspects, methods of detecting and treating cortical or cerebral visual impairment in children/juveniles.

BACKGROUND

Cortical, or cerebral, visual impairment (CVI) is the most common cause of pediatric visual impairment in developed and some developing countries, accounting for 20 to 48% of cases.[1-4] CVI refers to visual deficits caused by damage to post-geniculate visual pathways in the brain.[5] Leading causes of CVI include prematurity with periventricular leukomalacia, hypoxic-ischemic encephalopathy, hydrocephalus, structural brain abnormalities, and seizures.[1, 5-9] The strict definition of CVI requires reduced visual acuity and/or visual fields, but some experts also diagnose CVI in children who present with visual processing abnormalities only.[10, 11] Children with CVI frequently manifest diverse deficits of visual function and ocular motility beyond loss of acuity.[10, 12] Despite this, current methods of visual assessment in pediatric CVI focus mainly on visual acuity.[13, 14] A more comprehensive method to evaluate visual function in children with CVI may guide clinical care and also facilitate design and testing of therapeutics.

SUMMARY

Aspects of the present inventive concept relate to methods of determining, detecting and/or treating a neurological deficit such as cortical or cerebral visual impairment (CVI), and in some aspects, methods of the inventive concept relate to determining, detecting and/or treating a neurological deficit, such as CVI, in children/juveniles.

The methods may include having the subject view predefined still images and videos for a period of time not to exceed 20 minutes and recording the direction of the subject's eye gaze; testing the subject's grating acuity; measuring the subject's Teller acuity; and correlating the results of the foregoing to validate an eye tracking assessment to determine whether a subject has a cortical or cerebral visual impairment.

According to another aspect of the present inventive concept, provided are methods of treating a cortical or cerebral visual impairment (CVI) in a subject including determining whether the subject has CVI; according to the methods described herein, and if it is determined that the subject has CVI, treating the subject for CVI and other neurological deficits.

Aspects of the present inventive concept further provide standardized methods of assessing pediatric or adolescent visual acuity that include having a subject view predefined still images and videos for a period of time not to exceed 20 minutes and recording the direction of the subject's eye gaze; testing the subject's grating acuity; measuring the subject's Teller acuity; and correlating the results of the foregoing to validate an eye tracking assessment to evaluate a subject's visual acuity.

DETAILED DESCRIPTION

Figure 1:
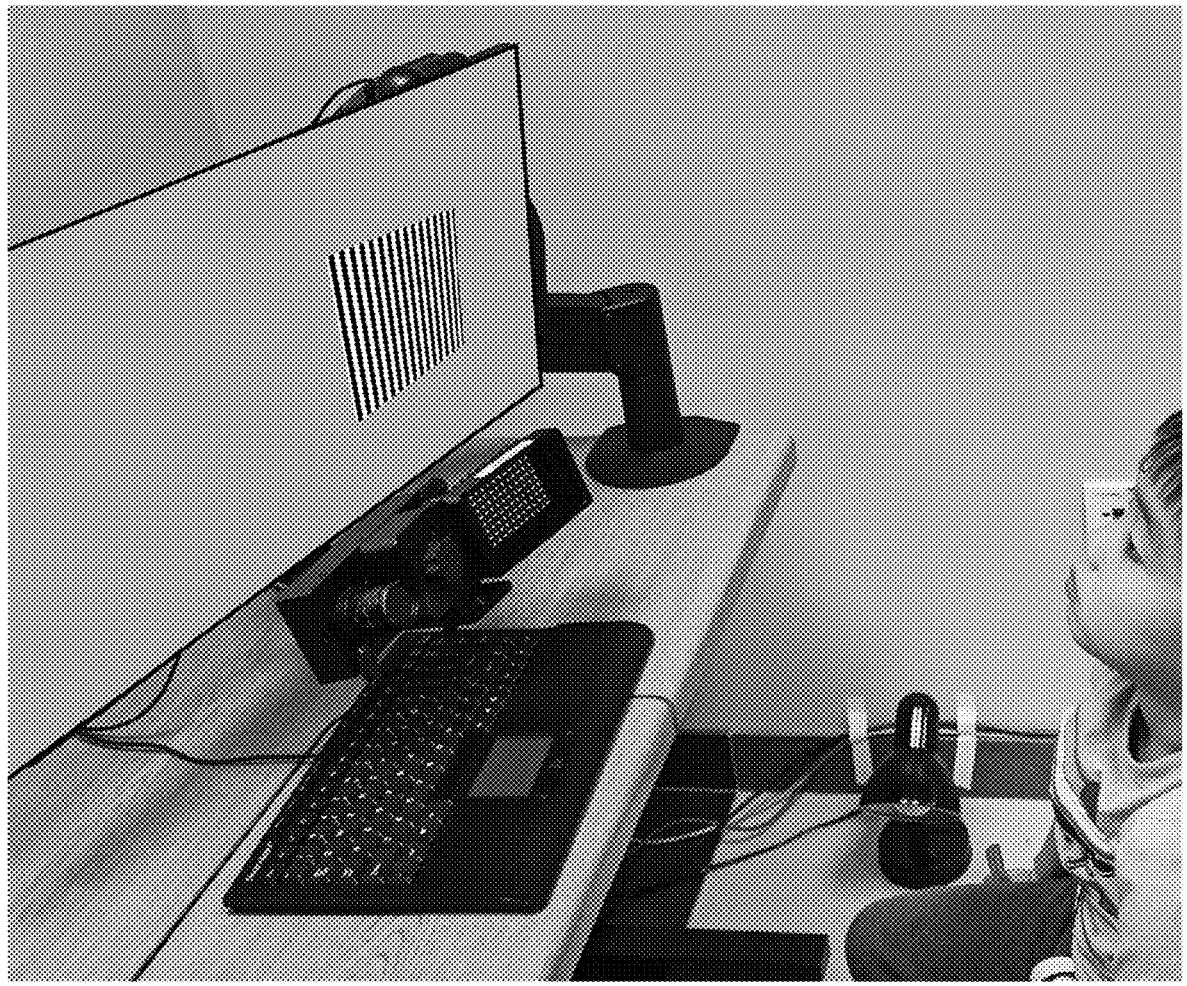
FIG. 1. Eye tracking experimental setup. Children viewed visual stimuli on a computer monitor while an infrared camera below the monitor tracked the corneal and pupillary light reflections to calculate the direction of eye gaze.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a," "an," and "the" are used herein to refer to one or to more than one (i.e., at least one) of the grammatical object of the article. By way of example, "an element" means at least one element and can include more than one element. The term "and/or" includes any and all combinations of one, or more, of the associated listed items and may be abbreviated as "/".

The term "comprise," as used herein, in addition to its regular meaning, may also include, and, in some embodiments, may specifically refer to the expressions "consist essentially of" and/or "consist of." Thus, the expression "comprise" can also refer to embodiments, wherein that which is claimed "comprises" specifically listed elements does not include further elements, as well as embodiments wherein that which is claimed "comprises" specifically listed elements may and/or does encompass further elements, or encompass further elements that do not materially affect the basic and novel characteristic(s) of that which is claimed. For example, that which is claimed, such as a method "comprising" specifically listed elements also encompasses, for example, a method "consisting of," i.e., wherein that which is claimed does not include further elements, and, for example, a method "consisting essentially of," i.e., wherein that which is claimed may include further elements that do not materially affect the basic and novel characteristic(s) of that which is claimed.

The term "about" generally refers to a range of numeric values that one of skill in the art would consider equivalent to the recited numeric value or having the same function or result. For example, "about" may refer to a range that is within ±1%, ±2%, ±5%, ±10%, ±15%, or even ±20% of the indicated value, depending upon the numeric values that one of skill in the art would consider equivalent to the recited numeric value or having the same function or result. Furthermore, in some embodiments, a numeric value modified by the term "about" may also include a numeric value that is "exactly" the recited numeric value. In addition, any numeric value presented without modification will be appreciated to include numeric values "about" the recited numeric value, as well as include "exactly" the recited numeric value. Similarly, the term "substantially" means largely, but not wholly, the same form, manner or degree and the particular element will have a range of configurations as a person of ordinary skill in the art would consider as having the same function or result. When a particular element is expressed as an approximation by use of the term "substantially," it will be understood that the particular element forms another embodiment.

The terms "subject" and "patient" may be used interchangeably and refer to any animal being examined, studied, or treated. It is not intended that the present disclosure be limited to any particular type of subject. In some embodiments of the present invention, humans are the preferred subject. Human subjects may be of any race or ethnicity, including, but not limited to, Caucasian, African-American, African, Asian, Hispanic, Indian, etc., and combined backgrounds, of any gender (for example, male, female or transgender), and may be, for example, a neonate, an infant, a juvenile, an adolescent, an adult, or an elderly human subject. In some embodiments of the inventive concept, the human subject is a neonate, infant, juvenile, adolescent, or young adult. For example, in some embodiments of the inventive concept, the human subject is less than 1 year, 1, 2, 3, 4, 5, 6, 7, 8, 9, 10, 11, 12, 13, 14, 15, 16, 17, 18, 19, 20 or 21 years of age. In some embodiments, the human subject is between the ages of about 12 months to about 12 years in age. In some embodiments, the subject is suspected of having cortical or cerebral visual impairment (CVI). In some embodiments, the subject is at risk for cortical or cerebral visual impairment (CVI). In some embodiments, the subject suffers from optic atrophy, hypoxic ischemic encephalopathy and/or strabismus.

The terms "treat", "treatment" and "treating" refer to the reduction or amelioration of the severity, duration and/or progression of a disease or disorder, or one or more symptoms thereof resulting from the administration of one or more therapies. An "appropriate treatment regimen" refers to the standard of care needed to treat a specific disease or disorder.

Unless otherwise defined, all technical terms used herein have the same meaning as commonly understood by one of ordinary skill in the art to which this disclosure belongs.

Children with CVI exhibit unique visual characteristics compared to those with ocular visual impairment, but most of these features have not been previously quantitated. Moreover, although various visual stimulation therapies have been proposed to improve vision in CVI, each has utilized a different method of visual assessment, and none has demonstrated efficacy in a controlled trial. The lack of a standardized method of visual assessment in children with CVI, whose age and neurologic deficits often preclude cooperation with typical visual testing, is an important barrier to designing and testing treatments.

The present inventive concept provides systematic evaluation of eye tracking for visual acuity assessment in pediatric CVI allowing quantitative, objective, and/or comprehensive measure of visual function in children with CVI. In some embodiments, eye tracking utilizes an infrared camera to capture eye movements while children view pictures and videos. Notably, in particular embodiments, the picture and video images are specifically selected to capture and maintain the interest of the subject being assessed. For example, where the subject is a child, the visual stimulus may be cartoons, pictures of other children, family members, shapes, toys and animals; video games; sporting events and cultural events such as dance performances, puppetry, etc.

The following parameters are assessed with eye tracking: grating acuity, contrast threshold, color saturation threshold, motion detection, crowding effect, visual search performance, visual field defects, and/or oculomotor features (such as saccade latency and fixation duration).

In some embodiments, subjects, i.e., children between the ages of 12 months to 12 years, are selected to view a less than 20-minute series of predefined still images and videos.

The direction of the subject's eye gaze is recorded using an eye tracking apparatus, such as an SR research EyeLink 1000, which uses an infrared camera and the pupillary and corneal light reflexes to determine the direction of gaze.

Grating acuity is tested by preferential looking on an object, such as a physical screen, video screen, or computer monitor, where grating is shown for about 3 seconds, and the eye gaze fixations are recorded by the camera. When greater than 50% of fixations are within the grating, it is considered to be 'seen.' The highest frequency grating seen by the participants is the visual acuity threshold.

Subjects undergo Teller acuity measurement by a masked examiner where the masked examiner shows the participant an object, such as a card, with vertical gratings randomly positioned to the right or left of the object. The examiner determines whether the subject looks toward the object by observing the subject's eye and head movements. The masked examiner (human or non-human) is unaware of the subject's eye examination history or eye tracking history. The Teller acuity test usually takes about 5 minutes.

Grating acuity by eye tracking and Teller acuity are correlated where grating acuity by eye tracking and Teller acuity results are entered into a statistical software to correlate the data. Pearson's correlation coefficient and p-value are calculated.

Correlation of the results of visual behavior scale, Teller acuity, and eye tracking are used to validate the eye tracking assessment.

In some embodiments, the present eye tracking assessment technique will generate a wealth of data that can be interpreted using a machine learning model. In some embodiments, the evaluation technique provided herein may be administered by a technician and subject to automated interpretation.

In addition to assessing CVI, the present inventive concept can be used to assess traumatic brain injury (TBI) or a nondegenerative, noncongenital insult to the brain from an external mechanical force, possibly leading to permanent or temporary impairment of cognitive, physical, and psychosocial functions, typically associated with a diminished or altered state of consciousness. Examples of TBI include, but are not limited to, coup-contrecoup brain injury, brain contusion, second impact syndrome, shaken baby syndrome and penetrating Injury.

Because the present inventive concept does not rely solely on one type of visual assessment in pediatric CVI, the present inventive concept provides a more comprehensive method to evaluate visual acuity including assessments for CVI. The present inventive concept provides a standardized method of assessing pediatric or adolescent visual acuity, the method includes having a subject view predefined still images and videos for a period of time not to exceed 20 minutes and recording the direction of the subject's eye gaze; testing the subject's grating acuity; measuring the subject's Teller acuity; and correlating the foregoing to validate an eye tracking assessment to evaluate a subject's visual acuity, including CVI.

Various aspects of the present inventive concept will be explained in further detail in the following examples, which are included herein for illustration purposes only, and which are not intended to be limiting to the invention.

Example 1

Eye Tracking for Assessment of Cortical Visual Impairment

Cortical visual impairment (CVI) is the leading cause of pediatric visual impairment in developed countries, but there is currently no evidence-based treatment. A method of visual assessment that captures multiple domains of visual functioning may facilitate evaluation of proposed therapies. An eye tracking protocol that evaluates afferent, efferent, and higher-order visual parameters in children with CVI and report its validity and reliability in assessing visual acuity has been developed. Eye tracking demonstrates excellent reliability for visual acuity assessment and high correlation with clinical assessment of visual acuity in pediatric CVI.

Specifically, eye tracking technology has been adapted for visual assessment in children with CVI. Eye tracking uses an infrared camera that captures the pupillary and corneal light reflexes of each eye while a child views stimuli of interest on a computer monitor (FIG. 1). The location of eye gaze is calculated with high spatial (less than 1 degree error) and temporal (recorded at 500 Hz, or every 2 milliseconds) accuracy. Previous investigators have used eye tracking to assess visual search ability in older individuals with CVI with relatively good central visual acuity.[15, 16] These studies showed that eye tracking could distinguish between ocular and cerebral causes of visual impairment based on greater adverse effect of visual crowding on the accuracy of target fixation in individuals with CVI. Certain aspects of ocular motility in CVI, such as visual reaction time, have also been evaluated using eye tracking.[17] Although a major advantage of eye tracking is that multiple afferent, efferent, and higher-order visual characteristics may be evaluated, the technique first requires validation by assessing its ability to quantify basic visual parameters, such as visual acuity (i.e., the clarity or sharpness of vision). The results of this study evaluating the validity and reliability of the present eye tracking technique for assessment of visual acuity in children with CVI is described below.

This study was approved by the local institutional review board (IRB) and adhered to the tenets of the Declaration of Helsinki and the US Health Insurance Portability and Accountability Act of 1996. Informed consent was obtained from the parent or legal guardian of all participants. Children diagnosed with CVI were prospectively recruited from the pediatric neuro-ophthalmology clinic. CVI in children with reduced visual acuity was diagnosed with a normal eye exam, or visual acuity worse than expected based on the degree of ocular pathology (the only intraocular pathology permitted for study inclusion was mild optic atrophy). Additionally, children were required to have a known risk factor for CVI (e.g., hypoxic ischemic encephalopathy with neuroimaging evidence of damage to post-geniculate visual pathways).

Patients between the ages of 12 months and 12 years were included whose visual acuity was sufficient to view stimuli on the computer monitor (at least level 3 on a six-level scale of visual behavior. See Table 1.

TABLE 1

Six-level scale of clinical visual acuity.

| | |
|---|---|
| 1 | Light perception only |
| 2 | Occasional fixation on large objects, faces, or movement |
| 3 | Occasional fixation on small objects or reliable fixation on large objects (4-inch lighted toy at 1 foot) or faces, or optotype acuity worse than 20/400 |
| 4 | Reliable fixation on small objects (2-inch toy at 1 foot), or optotype acuity between 20/400 to 20/200 |
| 5 | Reliable fixation and pursuit of small objects (2-inch toy at 1 foot), or optotype acuity between 20/200 to 20/50 |
| 6 | Reliable fixation and pursuit of smallest objects (1-inch toy at least 2 feet away), or optotype acuity between 20/50 to 20/20 |

Patients with photosensitive epilepsy and those with any intraocular abnormality were excluded, with the exception of mild optic atrophy, which was allowed because of the high proportion of optic atrophy among our CVI patients. Patients with strabismus without limitation of ocular ductions were included in the study. None of the patients recruited had sustained nystagmus. This is likely because nystagmus is not a feature of CVI in the absence of ocular co-morbidities,[18] and all ocular abnormalities were excluded except for mild optic atrophy. Patients with oculomotor abnormalities were also excluded that would preclude accurate assessment of visual behavior, such as oculomotor apraxia. Additionally, age-matched control children were recruited with no ocular, neurologic, or developmental abnormalities other than corrected refractive error.

Figure 4:
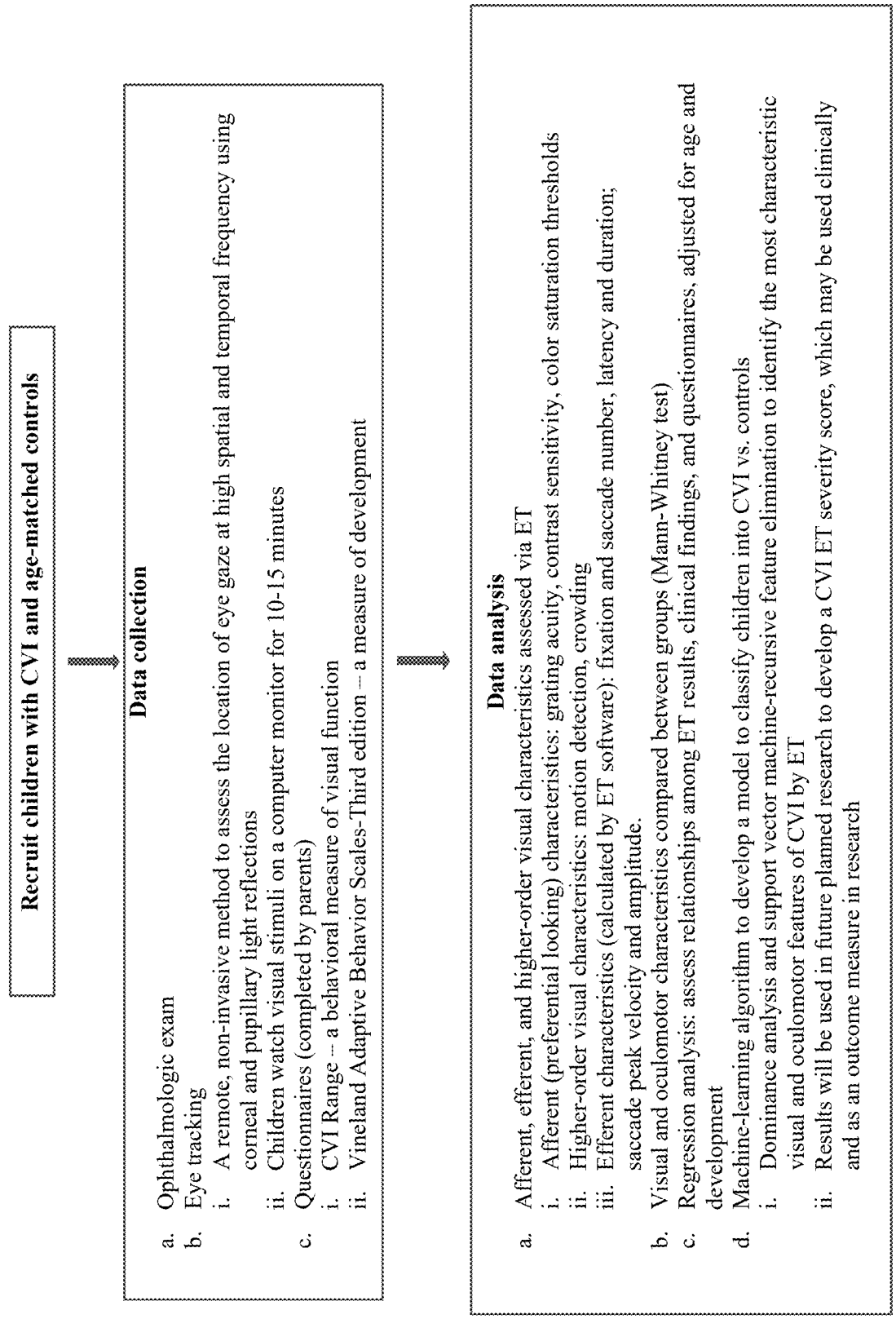
FIG. 4. A flow diagram of the general process for eye tracking according to embodiments of the present inventive concept.

A flow diagram of the general process is presented in FIG. 4.

Clinical Acuity Assessment

All children underwent complete pediatric neuro-ophthalmologic examination, including assessment of best-corrected visual acuity based on visual behavior. We used a six-level scale of binocular visual acuity, modified from the scale published by Huo et al.[8] for visual assessment in children with CVI (Table 1). In brief, level 1 represented the worst acuity (light perception), while level 6 indicated normal visual behavior or optotype acuity at least 20/50. Clinical acuity assessment prior to eye tracking was performed by an attending pediatric neuro-ophthalmologist.

Eye-Tracking

Eye tracking was performed using the SR Research EyeLink 1000 Plus (SR Research, Ottawa, Canada). The room lights were turned off; the only illumination in the room was the 24-inch computer monitor. The monitor's brightness was adjusted so that the luminance measured 100 cd/m2 on a white background. A target sticker was placed on the child's forehead, and subjects were positioned in front of the computer monitor and attached eye tracking camera such that the distance between the sticker and the camera was 60 cm (FIG. 1). The child's head was centered within the camera view. Children were allowed to sit on a parent's lap or in a wheelchair, if needed. Children wore their habitual spectacles. Recording was performed binocularly, unless the patient had large-angle strabismus that precluded calibration of the non-fixating eye—in these patients, the fixating eye was recorded monocularly. Three-point calibration was performed, followed by the experimental visual stimuli, which lasted 12 minutes. Participants were not required to follow any specific instructions, other than to continue to watch the computer screen and try to minimize head movement. A neck pillow was used to stabilize the head if excessive movement was noted. During the eye tracking session, a warning sound was played if the corneal and pupillary light reflections were lost. This was typically due to the child's attention wandering away from the screen or head movement, and it was corrected by experimenters repositioning the head or redirecting attention to the screen, using a toy if necessary.

The visual stimuli included a series of still images and videos. This study focused only on grating acuity, which was assessed using a preferential looking paradigm. A series of high-contrast black-and-white gratings were presented randomly to the right or left side of the screen at increasing frequencies. The background was a luminance-matched gray. The frequencies ranged from 0.25 to 20 cycles per degree (cpd). Each grating was presented for 2 seconds. The series of gratings was presented three times, with pictures and videos interspersed to maintain attention.

The eye tracking protocol was performed at baseline and one month later for reliability analysis.

Eye-Tracking Data Analysis

The eye tracker recorded X and Y coordinates of each eye every 2 milliseconds. Using these data, saccades and fixations were identified by the eye tracking software. Events were labeled as saccades when eye velocity exceeded 30 degrees/second, acceleration was greater than 8,000 degrees/second$^2$, and amplitude was above 0.1 degrees. Fixations were defined as events when the eyes moved less than 0.1 degrees over a duration of at least 100 milliseconds. When recording was performed binocularly, the data from the eye with the smallest error during calibration was used. If the patient had strabismus, data from the fixating eye (identified by clinical exam and confirmed by observing the video of the face during the recording) was used.

The grating acuity threshold was identified as the highest frequency grating that was preferentially viewed at least twice (out of three trials). Based on control data, a grating was considered 'seen' if at least 50% of total fixation time was within its borders.

Statistical Analysis

Grating acuity in cpd was converted to logMAR. Validity was evaluated by correlating grating acuity by eye tracking to clinical acuity measurement, using Spearman's rank correlation coefficient ($\rho$). Test-retest reliability was assessed by intraclass correlation coefficient (ICC) comparing baseline and one-month grating acuity thresholds. Data were stored in REDCap (Research Electronic Data Capture) 19 tools hosted at our university. Statistical analysis was performed using GraphPad Prism version 8.4.3 (GraphPad Software, San Diego, CA).

Results

Seventeen children with CVI and six controls were prospectively recruited for this study. All participants successfully completed calibration, but one child with CVI was unable to remain seated during the recording session and was excluded from analysis. The eye tracking results from 16 children with CVI are reported herein. The control data were used to determine the threshold for determining whether a grating was seen by a participant (see description in Methods). The clinical characteristics of the patients with CVI are shown in Table 2.

TABLE 2

Clinical characteristics of 16 children with cortical visual impairment (CVI) included in this study.

| | |
|---|---|
| Median age (range) | 5 years |
| | (1 to 12 years) |
| CVI etiology (%) | |
| Hypoxic-ischemic encephalopathy | 3 (19%) |
| Hydrocephalus | 1 (6%) |
| Seizures (infantile spasms) | 1 (6%) |
| Multiple etiologies[a] | 11 (69%) |
| Strabismus (%) | 13 (81%) |
| Exotropia (intermittent) | 8 (62%) |
| Esotropia (intermittent or constant) | 5 (38%) |
| Mild optic atrophy (%) | 6 (38%) |
| Median clinical visual acuity on 6-level scale (range)[b] | 4 (3 to 6) |
| Visual field defect to confrontation | 1 (6%) |

[a]Diagnoses in patients with multiple etiologies of CVI included infections (meningoencephalitis), structural brain abnormalities, genetic disorders, and seizures.
[b]See able 1 for clinical visual acuity definitions.

The median age was 5 years (range 1 to 12 years). Thirteen (81%) patients had strabismus, and six (38%) patients had mild optic atrophy that did not explain the degree of visual loss. The median visual acuity was 4 on the six-level scale (reliable fixation on small objects or optotype acuity between 20/400 to 20/200). One patient with tuberous sclerosis and a presumed hamartoma involving the right optic radiations was suspected of having a left homonymous hemianopia on clinical examination. Confrontational visual field testing was limited in all patients due to cooperation, but no other obvious visual field defects were identified on clinical examination.

Figure 2:
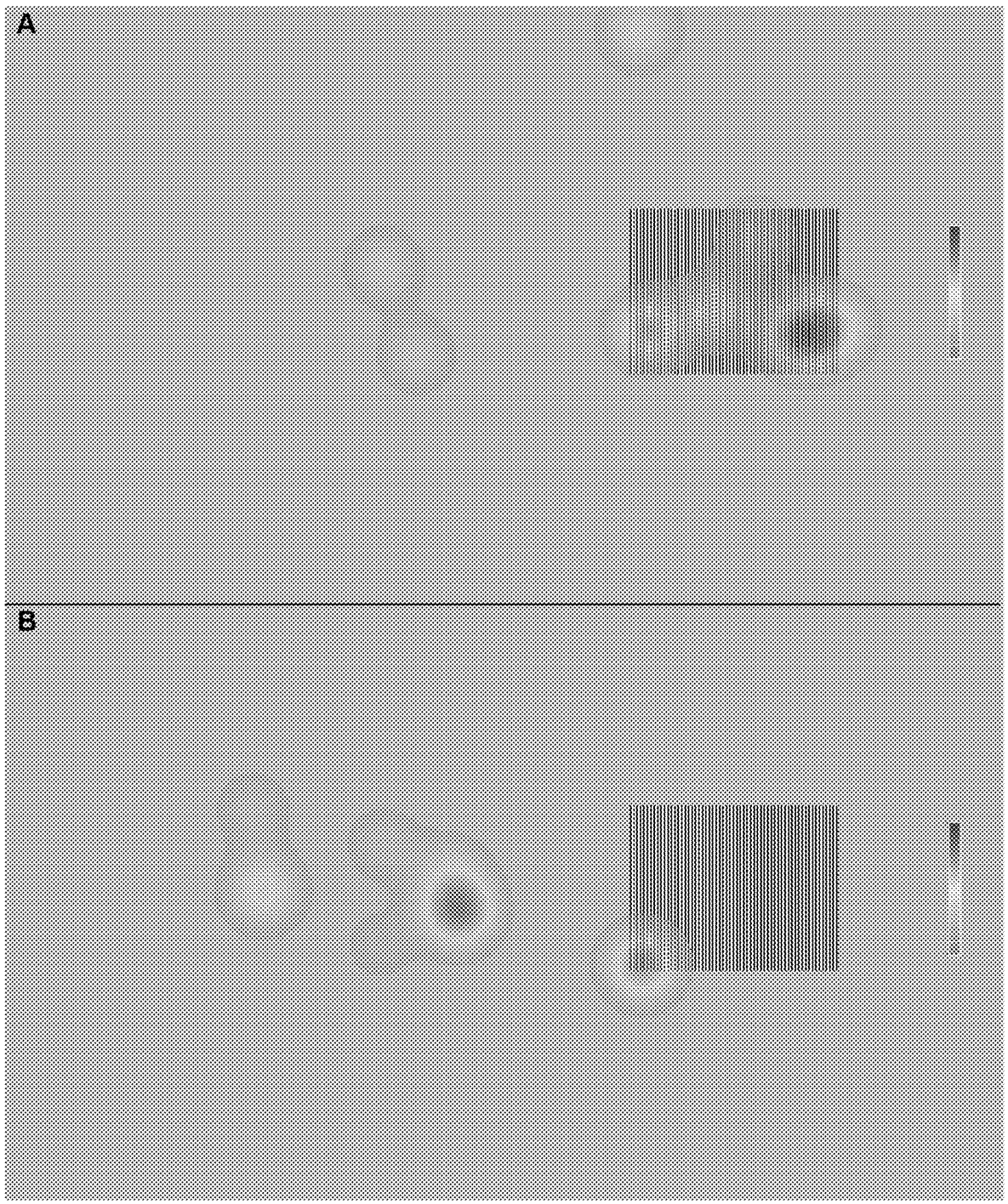
FIG. 2. Examples of eye tracking trials in children with cortical visual impairment. Heat maps illustrate locations of fixation, with red indicating longer fixation duration. Panel A) This grating was considered 'seen,' as greater than 50% of total fixation time was located within the grating. Panel B) This grating was considered 'not seen,' since less than 50% of total fixation time was located within the grating.

FIG. 2 show examples of eye tracking trials in which the grating was (Panel A) and was not (Panel B) preferentially viewed. Grating acuity thresholds by eye tracking were successfully obtained in all 16 participants.

Figure 3:
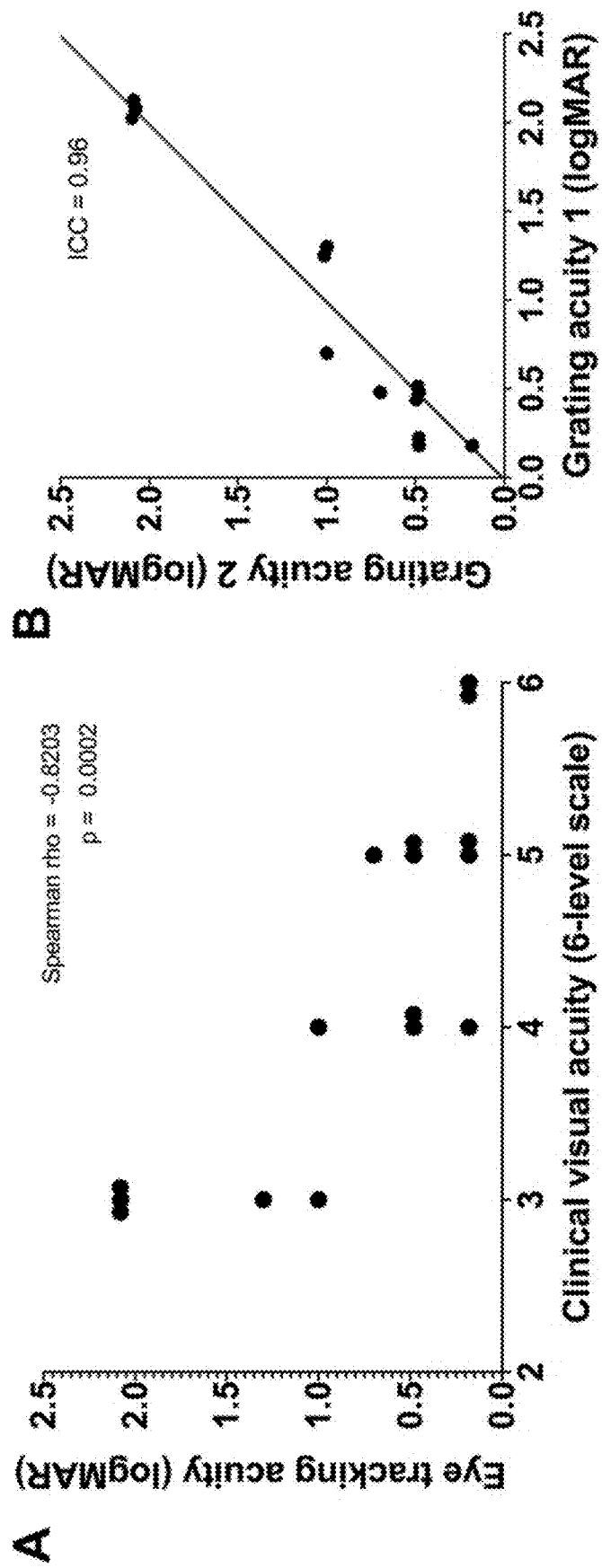
FIG. 3. Panel A) Grating acuity by eye tracking, in logMAR, and clinical visual acuity assessed using the six-level scale described in Table 1, in 16 children with cortical visual impairment. Panel B) Correlation between baseline (grating acuity 1) and one-month (grating acuity 2) eye tracking results. The solid line indicates the location of test points with perfect correlation. ICC=intraclass correlation coefficient.

FIG. 3 (Panel A) shows the correlation between grating acuity by eye tracking and clinical visual acuity. The grating acuity ranged from 0.25 to 20 cpd (Snellen equivalent 20/2400 to 20/30, logMAR 0.18 to 2.08). There was strong correlation between grating acuity by eye tracking and clinical acuity assessment ($\rho=-0.82$, $p=0.0002$).

Of the 16 children with CVI, 14 returned for repeat eye tracking at one month. One family did not return due to the onset of the COVID-19 pandemic. The reason for loss to follow-up in the second family is unclear. Additionally, one patient had a seizure during the one-month eye tracking session, so test-test reliability was assessed in 13 patients. FIG. 3 (Panel B) shows the grating acuity by eye tracking at baseline (grating acuity 1) and one month (grating acuity 2) in these 13 patients. The reliability was excellent, with an ICC of 0.96 (95% CI 0.88 to 0.99).

On subgroup analysis of the ten patients without optic atrophy, the correlation between eye tracking and clinical acuity was strong ($\rho=-0.91$, $p=0.0008$) and test-retest reliability by ICC remained excellent at 0.92 (95% CI 0.78 to 0.99).

Discussion

These results demonstrate high test-retest reliability of visual acuity measurement by eye tracking in children with CVI, in addition to excellent correlation with clinical acuity measurement. The preferential looking task in our experiment, similar to Teller acuity cards, does not require active participation and therefore is suitable for children with neurologic and intellectual deficits. However, eye tracking assessment of visual acuity is more efficient than Teller acuity, which is an important consideration given the limited attention of many children with CVI. Although the complete eye tracking experiment lasted 12 minutes due to inclusion of other test stimuli, the amount of time dedicated to visual acuity testing was less than two minutes. The main advantage of eye tracking over Teller cards, however, is the potential to simultaneously assess multiple aspects of visual function, whereas Teller cards only assess visual acuity. Similarly, sweep VEP, which is the most commonly used research method to assess vision in children with CVI,[14] is limited to assessing a few individual parameters such as visual acuity and contrast sensitivity. Comprehensive assessment of afferent, efferent, and higher-order visual characteristics is important because of the diversity of visual and oculomotor deficits that have been noted in children with CVI, including increased latency to fixation, selective sparing or disruption of motion sensitivity, and difficulties with visual complexity.[1,6]

This is believed to be the first technique to systematically evaluate eye tracking for visual acuity assessment in pediatric CVI. However, two other groups have conducted eye tracking studies in patients with CVI. Bennett et al. developed eye tracking experiments to test the crowding phenomenon in older and higher-functioning individuals with CVI (mean age 18.7 years, lowest visual acuity 20/80) who performed a visual search task.15, 16 The investigators found that patients with CVI performed more poorly with a greater number of distractors, in contrast to controls and patients with ocular causes of visual impairment. Kooiker et al. used eye tracking to demonstrate that children with CVI had delayed visual reaction times compared to children with ocular causes of visual impairment.[17]

Patients with mild optic atrophy were included because of the difficulty recruiting a sufficient number of patients without this comorbidity. However, subgroup analysis including only the patients without optic atrophy was performed, and yielding similar results. Additionally, one child experienced a seizure during the eye tracking experiment. This patient had a history of poorly controlled seizures, and although the mother of the child believed the seizure was not triggered by the experiment, this possibility cannot be ruled out. All recruited patients successfully completed calibration for our study, but one patient had to be excluded from analysis because he was jumping up and down throughout the recording session. Compared to Teller acuity testing, eye tracking may be less likely to be impacted by visual field defects because recording was performed from the central 32 degrees of the visual field, whereas Teller cards occupy 53 degrees of the visual angle if tested at 55 cm. However, any preferential looking test is likely to be inaccurate in patients with a dense visual field defect, such as a hemianopia. Interestingly, the single patient in this study suspected of having a hemianopia did not show a preference for visual stimuli presented to the right or left sides of the screen. The patient had an intermittent exotropia, and recordings were analyzed from his preferred right eye. It is believed that the intermittent left exotropia served to expand his visual field in the setting of a left hemianopia, such that he was able to recognize fixation targets on both sides of the screen. Future technology may enable individualized eye tracking evaluation in which stimuli are presented to intact areas of the visual field, similar to low-vision devices that have already been described.[20]

Conclusions

In summary, this study demonstrates that in a sample of children with CVI, eye tracking correlates well with clinical acuity assessment and has excellent test-retest reliability. Eye tracking can serve as a quantitative, objective, and comprehensive measure of visual function in children with CVI, with applications in both clinical and research settings.

Example 2

Additional Eye Tracking Protocol for Assessment of Cortical Visual Impairment

Eye tracking will be performed using the EyeLink® in an established, dedicated eye tracking room within the Saban Research Institute at Children's Hospital Los Angeles. Children will sit in front of a large computer monitor, which will be used to present visual stimuli for a total of 10-15 minutes (FIG. 1). Young children or those with neurologic disabilities may sit on a parent's lap or wheelchair. An infrared camera system will be used to track eye gaze using pupillary and corneal reflections at 500 Hz. The visual stimuli will be presented in a 10-15 minute video and fall into five categories. The first will employ a forced-choice preferential looking paradigm to determine grating acuity, contrast sensitivity, and color saturation threshold. The second will involve free viewing of static and dynamic naturalistic and cartoon scenes. The third will be modifications of the second category of stimuli, including still images of videos and cutouts of pictures, to assess the effects of motion and crowding. The fourth will involve pictures presented randomly to the four corners of the screen during central fixation, for a gross measure of visual field defects. Based on the screen size and viewing distance, the peripheral stimuli will be 18 degrees from central fixation. The fifth will be visual search arrays, where the ability of children to identify the target within a group of distractors will be evaluated.

Oculomotor responses to visual stimuli will be collected throughout the entire eye tracking session.

Questionnaires will be completed by the subject's parent or guardian, and results will be correlated with eye tracking findings. Caregivers of children with CVI will complete the CVI Range, to provide a behavioral assessment of visual function, as well as the Vineland Adaptive Behavior Scales-Third edition (VABS-III). The VABS-III is a validated scale that assesses daily functioning and provides a behavioral measure of development.

Data Analysis

Eye tracking data from preferential looking stimuli will be evaluated to assess afferent visual characteristics (grating acuity, contrast sensitivity, and color saturation thresholds). A stimulus will be considered seen if at least 50% of fixation time or screen dwell time is spent within the borders of the stimulus. This threshold is based on the examination of control data acquired thus far.

The following oculomotor parameters will be calculated by the eye tracking software: fixation and saccade number, latency and duration, and saccade peak velocity and amplitude.

Higher-order visual characteristics to be evaluated by eye tracking include crowding and motion detection. Crowding will be assessed by two measures—performance on visual search arrays, and the proportion of cases in which fixation is improved when a picture is shown on a plain vs. complex background. Motion detection will be quantified as the proportion of cases in which fixation is improved by viewing a moving vs. still picture. We chose this method rather than traditional motion detection paradigms, such as random dot kinematograms, because it may better represent functional vision and capture the attention of young and neurologically impaired children with CVI.

Eye tracking parameters in children with CVI will be compared to controls using the t-test, or Mann-Whitney test if data do not meet criteria for normal distribution. Additionally, linear regression will be used to correlate the results of clinical examination, eye tracking parameters, and questionnaires. Multiple regression will be used to determine whether age and development affect eye tracking results.

Additionally, results of afferent, efferent, and higher-order visual parameter testing will be incorporated into a machine learning model of eye tracking in children with CVI. The model will utilize dominance analysis and support vector machine-recursive feature elimination (SVM-RFE), a machine learning technique for identifying features with greatest classification accuracy, to quantitatively identify the eye tracking features that best distinguish between CVI and control participants. The classification accuracy of each eye tracking parameter (e.g. contrast sensitivity threshold, saccade latency) will be calculated, which will indicate the degree to which each visual characteristic is affected in CVI. We will also apply the machine learning algorithm to subgroups of children with different causes of CVI, to determine if CVI etiology affects eye tracking results. Additionally, the sensitivity, specificity, and accuracy of the overall model for classifying children into those with and without CVI will be calculated.

Example 3

Eye Tracking and Teller Acuity in Children with Cortical Visual Impairment

The aim of this study is to validate an eye tracking measure of grating acuity by correlating to Teller acuity scores in children with CVI.

Methods

Children with CVI between the ages of 12 months to 12 years were prospectively recruited. Participants viewed a 12-minute series of still images and videos on a computer monitor designed to assess multiple visual parameters, while the direction of eye gaze was recorded. Grating acuity was tested by preferential looking on the computer monitor. Participants also underwent Teller acuity measurement by a masked examiner. Grating acuity by eye tracking and Teller acuity were correlated.

Results

Sixteen children with CVI were recruited. Grating acuity by eye tracking ranged from 0.25 to 20 cpd. Teller acuity ranged from 0.23 to 13 cpd. There was a strong correlation between the two measures (r=0.81, p=0.0001). Grating acuity by eye tracking was better than Teller acuity in 13 of 16 patients.

CONCLUSIONS

Grating acuity by eye tracking shows strong correlation to Teller acuity, suggesting that eye tracking is a valid method for visual acuity assessment. Similar to sweep VEP, grating acuity by eye tracking may overestimate acuity in children with CVI when compared to Teller cards.

REFERENCES

1. Chang M Y, Borchert M S. Advances in the evaluation and management of cortical/cerebral visual impairment in children. Surv Ophthalmol 2020; 65:708-24.
2. Rahi J S, Cable N, British Childhood Visual Impairment Study G. Severe visual impairment and blindness in children in the UK. Lancet 2003; 362:1359-65.
3. Pehere N K, Narasaiah A, Dutton G N. Cerebral visual impairment is a major cause of profound visual impairment in children aged less than 3 years: A study from tertiary eye care center in South India. Indian J Ophthalmol 2019; 67:1544-7.
4. Kong L, Fry M, Al-Samarraie M, Gilbert C, Steinkuller P G. An update on progress and the changing epidemiology of causes of childhood blindness worldwide. J AAPOS 2012; 16:501-7.
5. Good W V, Jan J E, DeSa L, Barkovich A J, Groenveld M, Hoyt C S. Cortical visual impairment in children. Surv Ophthalmol 1994; 38:351-64.
6. Jan J E, Groenveld M, Sykanda A M, Hoyt C S. Behavioural characteristics of children with permanent cortical visual impairment. Dev Med Child Neurol 1987; 29:571-6.
7. Khetpal V, Donahue S P. Cortical visual impairment: etiology, associated findings, and prognosis in a tertiary care setting. J AAPOS 2007; 11:235-9.
8. Huo R, Burden S K, Hoyt C S, Good W V. Chronic cortical visual impairment in children: aetiology, prognosis, and associated neurological deficits. Br J Ophthalmol 1999; 83:670-5.
9. Handa S, Saffari S E, Borchert M. Factors Associated With Lack of Vision Improvement in Children With Cortical Visual Impairment. J Neuroophthalmol 2018; 38:429-33.
10. Dutton G, Ballantyne J, Boyd G, et al. Cortical visual dysfunction in children: a clinical study. Eye (Lond) 1996; 10 (Pt 3):302-9.
11. Saidkasimova S, Bennett D M, Butler S, Dutton G N. Cognitive visual impairment with good visual acuity in children with posterior periventricular white matter injury: a series of 7 cases. J AAPOS 2007; 11:426-30.
12. Good W V, Hoyt C S. Behavioral correlates of poor vision in children. Int Ophthalmol Clin 1989; 29:57-60.
13. Chang M Y, Borchert M S. Methods of visual assessment in children with cortical visual impairment. Curr Opin Neurol 2021; 34:89-96.
14. Good W V. Development of a quantitative method to measure vision in children with chronic cortical visual impairment. Trans Am Ophthalmol Soc 2001; 99:253-69.
15. Bennett C R, Bailin E S, Gottlieb T K, Bauer C M, Bex P J, Merabet L B. Assessing Visual Search Performance in Ocular Compared to Cerebral Visual Impairment Using a Virtual Reality Simulation of Human Dynamic Movement. Proceedings of Technology, Mind, and Society. Washington, DC: Association for Computing Machinery; 2018.
16. Bennett C R, Bailin E S, Gottlieb T K, Bauer C M, Bex P J, Merabet L B. Virtual Reality Based Assessment of Static Object Visual Search in Ocular Compared to Cerebral Visual Impairment. In: Antona M, Stephanidis C, editors. Universal Access in Human-Computer Interaction Virtual, Augmented, and Intelligent Environments UAHCI 2018 Lecture Notes in Computer Science: Springer, Cham; 2018.
17. Kooiker M J G, Verbunt H J M, van der Steen J, Pel J J M. Combining visual sensory functions and visuospatial orienting functions in children with visual pathology: A longitudinal study. Brain Dev 2018.
18. Whiting S, Jan J E, Wong P K, Flodmark O, Farrell K, McCormick A Q. Permanent cortical visual impairment in children. Dev Med Child Neurol 1985; 27:730-9.
19. Harris P A, Taylor R, Thielke R, Payne J, Gonzalez N, Conde J G. Research electronic data capture (RED-Cap)—a metadata-driven methodology and workflow process for providing translational research informatics support. J Biomed Inform 2009; 42:377-81.
20. Sayed A M, Kashem R, Abdel-Mottaleb M, et al. Toward Improving the Mobility of Patients with Peripheral Visual Field Defects with Novel Digital Spectacles. Am J Ophthalmol 2020; 210:136-45.

The foregoing is illustrative of the present invention and is not to be construed as limiting thereof. Further embodiments of the present inventive concept are exemplified in the following claims.

That which is claimed:

1. A method of determining whether a subject has a cortical or cerebral visual impairment (CVI), the method comprising:
   (a) having the subject view predefined still images and videos for a period of time not to exceed 20 minutes and recording the direction of the subject's eye gaze;
   (b) testing the subject's grating acuity, wherein the subject views a physical screen, video screen, or computer monitor, wherein grating is shown for 3 seconds, and eye gaze fixations are recorded by a camera wherein greater than 50% of fixations are within the grating are considered seen by the subject;
   (c) measuring the subject's Teller acuity; and
   (d) correlating results of (a), (b) and (c) using linear regression analysis to validate an eye tracking assessment to determine whether the subject has a cortical or cerebral visual impairment.

2. The method of claim 1, wherein the subject is an infant, a juvenile, or an adolescent human subject.

3. The method of claim 1, wherein the subject is a human subject between 12 months and 12 years in age.

4. The method of claim 1, further comprising exposing the subject to visual stimuli selected from a group consisting of cartoons; pictures of other children, family members, shapes, toys and animals; video games; sporting events and cultural events.

5. The method of claim 1, wherein testing the subject's grating acuity comprises presenting the subject vertical gratings of increasing frequencies randomly to both sides of an object showing the gratings.

6. The method of claim 1, wherein measuring the subject's Teller acuity comprises showing the subject an object having vertical gratings randomly positioned to a right side or a left side of the object, wherein it is determined whether the subject looks toward the object by observing eye and head movements of the subject.

7. The method of claim 6, wherein a pre-existing knowledge of a clinical eye examination of the subject or an eye tracking history of the subject is not considered.

8. The method of claim 1, wherein the method further comprises comprehensive assessment of afferent, efferent, and higher-order visual characteristics.

9. The method of claim 1, wherein the method further comprises having the subject view predefined still images and videos for a period of time not to exceed 20 minutes and recording the direction of the subject's eye gaze using pupillary and corneal reflections at 500 Hz.

* * * * *